Sept. 19, 1939.  A. D. ROSE  2,173,287
SIPHON FITTING FOR PRESSURE GAUGES
Filed Oct. 30, 1936
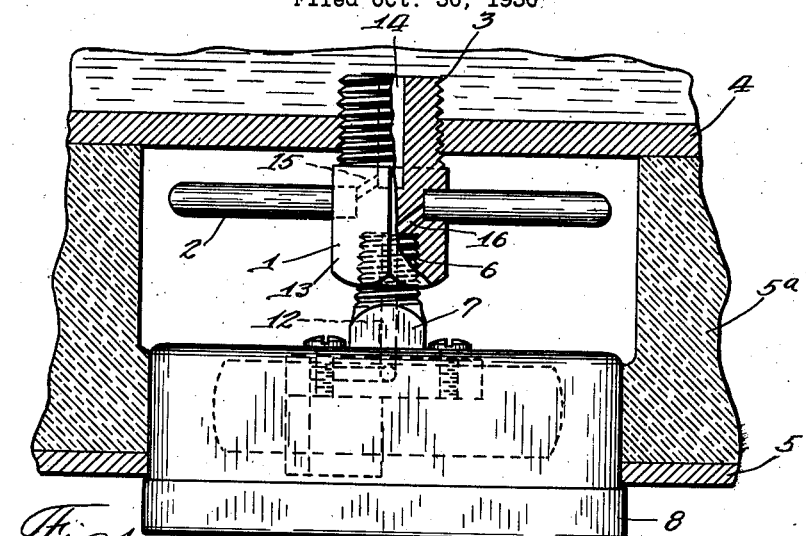
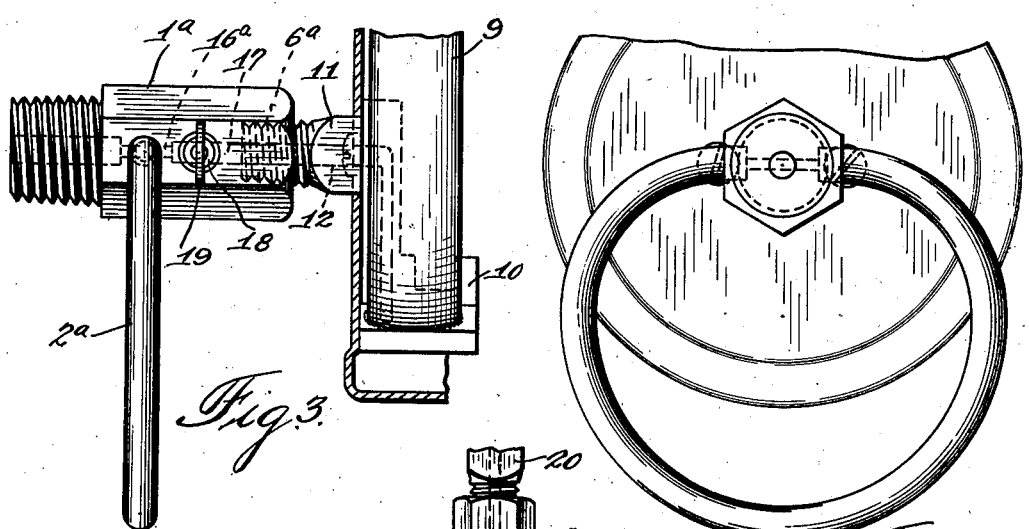

Patented Sept. 19, 1939

2,173,287

UNITED STATES PATENT OFFICE 2,173,287

SIPHON FITTING FOR PRESSURE GAUGES

Alexander D. Rose, Chicago, Ill., assignor to Jas. P. Marsh Corporation, Chicago, Ill., a corporation of Illinois Application October 30, 1936, Serial No. 108,339

8 Claims. (Cl. 73—31)

This invention relates to siphon fittings for pressure gauges, and more particularly to a siphon fitting or coupling adapted to be inserted between a pressure gauge and a pressure source and preferably arranged to support the pressure gauge. The device is intended to provide an external siphon in combination with any suitable pressure gauge which may be connected thereto.

It is the purpose of the so-called siphon fitting which constitutes the present invention to protect the Bourdon tube or other pressure responsive element and the associated soldered joints in the gauge from excessively high temperatures, in a manner which will maintain accurate reading of the gauge.

Soft solder is usually used in making Bourdon tube connections in a pressure gauge, and hot steam will affect the solder and will also stretch the tube and cause inaccurate reading. It is therefore an object to provide an external siphon fitting which may be subjected to high temperatures without injury to the fitting and which will prevent high temperatures from reaching and affecting any of the sensitive parts of the gauge.

It is an object of the invention to provide a fitting adapted for use with any suitable pressure responsive device and comprising a trap arranged to maintain a quantity of liquid therein and to cause air to be trapped in the pressure responsive element, thereby preventing steam or other heated pressure medium from entering and affecting the pressure responsive element, but which will allow the pressure responsive element to respond to pressure applied thereto through the fitting.

It is a further object to provide a combined fitting and trap for a pressure gauge wherein the fitting is provided with an elongated conduit providing an intermediate portion between the ends of said fitting, whereby a trap is formed for confining liquid. Also, the fitting is so constructed and arranged that it is capable of expansion or contraction in response to temperature changes without injury to the fitting or to the gauge associated therewith.

A further object is the provision of a fitting of the character described which is arranged to provide a liquid trap between a pressure responsive gauge and a pressure source and which may be conveniently mounted in the restricted space between a boiler or other pressure source and a pressure gauge supported substantially in alignment with the jacket of the boiler.

Further objects will be apparent from the specification and the appended claims. In the drawing, Figure 1 is a top view of one embodiment of the invention and illustrates the fitting mounted on a boiler or other pressure source and supporting a pressure gauge substantially in alignment with the boiler jacket;

Fig. 2 is a rear elevation of the fitting and pressure gauge illustrated in Fig. 1;

Fig. 3 is a side elevation of one of the fittings provided with a valve for closing the passage therein and illustrates a pressure gauge attached to the fitting. A portion of the pressure gauge is broken away for purposes of illustration;

Fig. 4 illustrates a slightly modified embodiment of the invention; and

Fig. 5 illustrates an embodiment of the invention arranged for supporting a vertical type gauge.

Referring to the drawing in detail, the embodiment illustrated comprises a comparatively short fitting having a body portion 1 and a conduit 2 secured thereto. The body portion 1 is externally threaded at 3 to enable it to be mounted in the usual manner on the boiler shell 4 or other suitable container providing a pressure source. Such boilers are usually provided with a so-called jacket 5, and it is desirable that the pressure gauge should be mounted substantially in alignment with the surface of the jacket. In order to accomplish this, the fitting is provided with an internal thread 6 into which a post or stem 7 of the usual pressure gauge 8 is inserted, and the pressure gauge may thereby be supported by the fitting. Insulation 5ª may be provided between the boiler wall 4 and the jacket 5.

The pressure gauge 8 may be any one of the usual types provided with a pressure responsive element, which latter may be a Bourdon tube 9 arranged to operate a suitable indicator in the usual manner. The Bourdon tube 9 is preferably supported on a bracket 10 provided with a stem or post 11. In the present instance the post 11 extends from the rear of the gauge. However, a gauge having the usual vertical post may be used, if desired, when certain embodiments of the invention are used in connection therewith. The post 11 is provided with the usual passage 12 communicating with the Bourdon tube 9. The unthreaded portion of the body 1 of the fitting is preferably hexagonal, as illustrated at 13, so that a wrench may be used thereon in mounting the fitting.

The conduit 2 forms a laterally extending loop or ring-like member having its opposite ends secured to the body portion 1. The inlet end of the fitting is provided with a bore 14 forming a passage for part of the length of the body and having a lateral passage 15 communicating therewith and with one end of the conduit as illustrated. The opposite end of the conduit 2 communicates with the threaded bore 6 in the outlet end by means of a passage 16. It will be understood, of course, that the body portions of these fittings may be made of various lengths in accordance with the distance between the boiler opening and the jacket or to comply with the requirements of various installations.

A preferred form of the invention is illustrated in Fig. 3, in which the body portion 1a may be somewhat longer than that illustrated in Fig. 1 and provided with a bore 17 extending from the threaded bore 6a and communicating with the passage 16a leading to one end of the conduit 2a. In this embodiment a valve 18 is provided for closing the bore 17 and the valve is provided with a suitable handle 19. The valve 18 is for the purpose of closing the passage when it is desired to remove the gauge 8 for any purpose or to prevent pressure being applied thereto. It is sometimes desirable to turn off the gauge in freezing weather to prevent injury by frozen condensate.

Fig. 4 illustrates another embodiment of the invention in which an elongated conduit 2b is wound around the body portion 1 and its opposite ends are connected thereto to form a continuous passage through the fitting in the same manner as illustrated in Fig. 1. In this embodiment the fitting need not be carefully adjusted as the conduit 2b always provides a trap below the point of connection of the conduit to the body portion.

The embodiment illustrated in Fig. 5 is particularly arranged for use with gauges having a vertical post or stem 20. This embodiment comprises a body portion 21 which may be substantially identical with the body portion illustrated in Fig. 1 and is provided with similar passages therein. In this embodiment, however, the conduit 2 is angularly positioned relative to the body portion 21, whereby the loop forms a suitable trap intermediate its ends as illustrated. It will be apparent that this embodiment may be used either vertically or horizontally, or may be angularly positioned if desired. In any event, a suitable trap is provided. A valve or cock, such as illustrated in Fig. 3, may be used with any of the embodiments herein disclosed.

Modifications may be made without departing from the spirit of the invention, and it is desired, therefore, that the invention be limited only to the prior art and the scope of the appended claims.

Having described this invention, what is claimed and desired to be secured by Letters Patent is:

1. The combination with a pressure gauge having a pressure inlet and a pressure responsive element and connected indicating mechanism, of an exterior fitting removably connected to said inlet, said fitting comprising a body portion having a bore in each end for a part of its length, and a substantially transverse siphon loop having its ends secured to the sides of said body and forming with said bores a continuous passage to said gauge pressure inlet.

2. A siphon fitting for pressure gauges comprising a body member having a longitudinally extending bore from each end for a portion of its length and a comparatively large ring-like conduit secured to said member and extending laterally therefrom and communicating with said bores to form a continuous passage said conduit being positioned relative to said bores to provide a siphon trap therebetween.

3. A siphon fitting comprising a body member arranged at one end for mounting on a pressure source and arranged at the other end to support a pressure gauge and having a bore extending from each end for a portion of its length, an elongated tubular element having its opposite ends secured to said body and its bore communicating with opposite ends of said body to form a continuous passage therethrough, an intermediate portion of said tubular element being disposed below said connection to provide a trap for confining liquid between the ends of said passage.

4. A siphon fitting for pressure gauges comprising a body member internally threaded at one end to receive a gauge post and exteriorly threaded at its opposite end for attachment to a pressure source, and a substantially ring-like siphon conduit having its ends secured to opposite sides of said body, said body having passages communicating with each end of said conduit and respective ends of said body to form a continuous passage therethrough.

5. A siphon fitting for pressure gauges comprising a body member constructed for connection between a pressure gauge and a pressure source, and an elongated conduit coiled around said body and having its ends connected thereto, said body having a passage from each end of said conduit to a respective end of said body to form a continuous siphon trap passage through said fitting.

6. A combined pipe fitting and trap for substantially horizontal mounting comprising a body portion having a bore in each end for a part of its length, and a substantially transverse siphon coil completely around the axis of said body and communicating with said bores to form a continuous passage whereby said coil provides a trap when said fitting is in any position of rotational adjustment.

7. A combined pipe fitting and trap for substantially horizontal mounting comprising a unit having its ends arranged for attachment between a pressure gauge and a pressure source, said unit having a passage therethrough, the opposed ends of said passage being substantially on the horizontal axis of said unit, and an intermediate portion of said passage extending substantially in the form of a coil around said axis whereby said passage provides a trap when said fitting is in any position of rotational adjustment.

8. The combination with a pressure gauge having a pressure responsive element, and an inlet means for connecting said pressure responsive element to a pressure source, of a siphon fitting connected between said inlet means and said pressure source, said fitting comprising a body portion having a bore extending from each end for a portion of its length, one of said bores communicating with said pressure responsive element through said inlet means, an elongated conduit outside said body and having its ends secured thereto in series relation between said bores to form a continuous passage through said fitting, said conduit forming a trap for confining fluid between the ends of said fitting, and a valve in said body between said conduit and one end of said body for closing said passage.

ALEXANDER D. ROSE.